(12) United States Patent
Bouesnard et al.

(10) Patent No.: US 9,234,382 B2
(45) Date of Patent: *Jan. 12, 2016

(54) INSULATING GLAZING

(75) Inventors: Olivier Bouesnard, Jumet (BE); Francois Closset, Jumet (BE)

(73) Assignee: AGC Glass Europe, Brussels (BE)

(*) Notice: Subject to any disclaimer, the term of this patent is extended or adjusted under 35 U.S.C. 154(b) by 0 days.

This patent is subject to a terminal disclaimer.

(21) Appl. No.: 14/004,780

(22) PCT Filed: Mar. 8, 2012

(86) PCT No.: PCT/EP2012/053968
§ 371 (c)(1),
(2), (4) Date: Sep. 12, 2013

(87) PCT Pub. No.: WO2012/123317
PCT Pub. Date: Sep. 20, 2012

(65) Prior Publication Data
US 2014/0004283 A1 Jan. 2, 2014

(30) Foreign Application Priority Data

Mar. 16, 2011 (BE) .................... 2011/0164

(51) Int. Cl.
*E06B 3/67* (2006.01)
*C03C 17/245* (2006.01)
(Continued)

(52) U.S. Cl.
CPC ........... *E06B 3/6715* (2013.01); *C03C 17/2453* (2013.01); *C03C 17/3417* (2013.01);
(Continued)

(58) Field of Classification Search
CPC  C03C 17/366; C03C 17/3681; C03C 17/253; C03C 17/2453; C03C 2217/24; C03C 2217/94; C03C 2217/948
See application file for complete search history.

(56) References Cited

U.S. PATENT DOCUMENTS 4,206,252 A    6/1980  Gordon
4,941,302 A *  7/1990  Barry ................... C03B 23/245
                                                428/34

(Continued)

FOREIGN PATENT DOCUMENTS

EP    0 844 219    5/1998
EP    1 293 726    3/2003
(Continued)

OTHER PUBLICATIONS

International Search Report Issued Apr. 23, 2012 in PCT/EP12/053968 Filed Mar. 8, 2012.

*Primary Examiner* — Aaron Austin
*Assistant Examiner* — Zheren J Yang
(74) *Attorney, Agent, or Firm* — Oblon, McClelland, Maier & Neustadt, L.L.P.

(57) ABSTRACT

The invention relates to an insulating double glazing comprising a sheet of glass which has on the face (2) an assembly of layers known as low-emissivity layers, produced by sputtering and comprising at least one infrared-reflecting metallic layer, the other glass sheet comprising on the face (4) one or more metal oxide layers deposited by gas pyrolysis, the space located between the sheets being sealed and filled with insulating gas composed of krypton for at least 86% by volume and at most 5% of air, this glazing having a light transmission which is no less than 60% (for thicknesses of the clear glass sheets of 4 mm), wherein said metal oxide layers comprising a doped tin oxide layer having haze of less than 0.3%, $R_a$ of less than 10 nm, and thickness of not less than 200 nm.

20 Claims, 1 Drawing Sheet

(51) Int. Cl.
*C03C 17/34* (2006.01)
*C03C 17/36* (2006.01)

(52) U.S. Cl.
CPC .............. *C03C17/36* (2013.01); *C03C 17/366* (2013.01); *C03C 17/3681* (2013.01); *C03C 2217/24* (2013.01); *C03C 2217/94* (2013.01); *C03C 2217/948* (2013.01)

(56) References Cited

U.S. PATENT DOCUMENTS

| | | | |
|---|---|---|---|
| 5,948,538 A | 9/1999 | Brochot et al. | |
| 6,797,388 B1 * | 9/2004 | Szanyi | C03C 17/3417 427/164 |
| 7,572,511 B2 * | 8/2009 | Hartig | 428/432 |
| 7,891,154 B2 * | 2/2011 | Cording | A47F 3/0434 52/171.2 |
| 8,658,262 B2 * | 2/2014 | Myli et al. | 428/34 |
| 2003/0113550 A1 * | 6/2003 | Millett | A47F 3/0434 428/432 |
| 2004/0169789 A1 | 9/2004 | Mathey et al. | |
| 2006/0005484 A1 * | 1/2006 | Riblier | A47F 3/0434 52/204.5 |
| 2006/0046072 A1 * | 3/2006 | Ferreira et al. | 428/432 |
| 2006/0141265 A1 * | 6/2006 | Russo | C03C 17/36 428/426 |
| 2008/0164788 A1 * | 7/2008 | Riblier | A47F 3/0434 312/116 |
| 2008/0280078 A1 | 11/2008 | Krisko et al. | |
| 2009/0011206 A1 * | 1/2009 | Schutz | C03C 17/3417 428/216 |
| 2009/0120496 A1 * | 5/2009 | Cording | C03C 17/3417 136/256 |
| 2010/0098888 A1 * | 4/2010 | Landon | C03C 27/10 428/34 |
| 2010/0247820 A1 | 9/2010 | Krisko et al. | |
| 2010/0255225 A1 * | 10/2010 | Cording | C03C 17/3417 428/34 |
| 2011/0023545 A1 * | 2/2011 | Liu | C03C 17/002 65/60.2 |
| 2011/0146768 A1 * | 6/2011 | Lu | C03C 17/3417 136/255 |
| 2011/0212279 A1 * | 9/2011 | Lemmer | C03C 17/3435 428/34 |
| 2011/0256325 A1 * | 10/2011 | Sanderson | B32B 17/10036 428/34 |
| 2012/0021149 A1 * | 1/2012 | Myli | C03C 17/3411 428/34 |
| 2012/0090246 A1 * | 4/2012 | Nunez-Regueiro | A47F 3/0434 49/484.1 |
| 2013/0174892 A1 * | 7/2013 | Ganjoo | H01B 1/08 428/34 |

FOREIGN PATENT DOCUMENTS

EP 1230188 B1 * 9/2003
WO 03 007060 1/2003

* cited by examiner

INSULATING GLAZING

CROSS REFERENCE TO RELATED APPLICATIONS

The present application is a 35 U.S.C. §371 national stage patent application of International patent application PCT/EP2012/053968, filed on Mar. 8, 2012, published as WO/2012/123317 on Sep. 20, 2012, the text of which is incorporated by reference, and claims the benefit of the filing date of Belgian application no. BE 2011/0164, filed on Mar. 16, 2011, the text of which is also incorporated by reference.

The present invention relates to glazing systems that have thermal insulating properties. The invention relates in particular to glazing systems, whose properties are associated with the presence of thin transparent layers that serve as selective filters of the transmitted wavelengths.

The production of glazing units that provide so-called low-emissivity properties represents a significant proportion of the improvements aimed at reducing energy consumption in the heating of buildings. Increasing the glass sheets to be included in the composition of such insulating glazing units is a way of improving their performance. It is not always possible for reasons of weight or space. In building renovations replacement is largely dependent on the existing frames. This is economically preferable to be able to reuse these frames and the glazing units most frequently are still double glazing units. For the latter that are substantially still the most frequently used, improvement in the performance of the low-emissivity systems used remains a permanent objective.

The reduction of emissivity must not significantly impair the other properties required for the insulating glazing units concerned. In particular the glazing units must retain as high a light transmission as possible and not exhibit an unacceptable colouration in reflection. As an indication, the glazing units must have as neutral a reflection as possible and, above all, not exhibit a purple colouration.

In addition to the low-emissivity properties, other thermal properties are equally sought, depending in particular on the locations of use of these glazing units. In regions where insolation requires the use of air-conditioning in buildings during the summer period, it is necessary to have glazing units with a solar factor (SF or also g) that must certainly be controlled. This solar factor is the sum of the solar energy transmitted directly by the glazing and the energy that is retransmitted to the interior of the building after absorption.

Two main types of low-emissivity layers are utilised on glass sheets. On the one hand, these are layers obtained by gas pyrolysis. These layers are substantially oxide-based. On the other hand, layer systems comprising one or more metal layers that selectively reflect infrared are used, said metal layers forming part of an assembly additionally comprising protective dielectric layers that control the selectivity of the filters formed. These systems are substantially produced by cathodic sputtering processes.

The choice of types of layers used in insulating glazing units is dependent on multiple criteria. Hence, pyrolytic layers have the advantage of being obtained directly on glass production lines. Their cost is much lower than that of layer systems deposited by cathodic sputtering. Moreover, pyrolytic layers are relatively "hard". They give a good resistance to mechanical and/or chemical stresses. However, the performance in terms of emissivity of these layers remains greatly inferior to that of layers deposited by cathodic sputtering. In contrast, these layers deposited by cathodic sputtering are fragile. They are referred to as "soft" and must be protected accordingly.

The improvement in emissivity of layers deposited by cathodic sputtering results in systems that are still more complex. In particular, this concerns increasing the reflective metal layers and at the same time increasing the dielectric layers accompanying them. The most complex systems consequently have a not inconsiderable cost that must be related to the gain obtained in terms of insulation.

For the reasons outlined above, a significant proportion of insulating glazing units is formed from relatively simple glazing units comprising two glass sheets, one of which is coated with a layer system obtained by cathodic sputtering with a single thin metal layer. To protect this layer system, it is arranged on a face of one of the sheets that is not exposed to any external factors and thus faces the space located between the two sheets.

Regulations in the field of energy saving stipulate the use of glazing systems with constantly higher performance. In the case of insulating glazing units with two glass sheets it is becoming increasingly difficult to push the limits of possible improvements to the layer systems. The search for novel solutions remains ongoing.

The inventors have shown that a perceptible improvement in properties could be obtained by utilising glazing units such a those defined in claim 1.

Assemblies of glass sheets, one of which is coated with a layer system obtained by pyrolysis, another with a layer system obtained by cathodic sputtering, have been proposed previously. These glass sheets were intended in particular for inclusion in the composition of doors for domestic ovens or doors for refrigeration appliances. In these applications the sheets in question formed part of an assembly comprising, for example, three glass sheets with at least two thereof having this structure. In these applications the essential property is, of course, to screen infrared radiation. The light transmission, while not negligible, can be brought to relatively modest values, e.g. in the order of 50% or less (measured in accordance with standard EN 410). Nevertheless, the optical quality of these products is not comparable with that required in architectural glazing systems. In particular the haze corresponding to the fraction of light diffused by the glazing can be significantly more substantial for these applications. Furthermore, the colouration in reflection is often reduced by using an intensely coloured glass for the outermost glass sheet from the oven.

For these reasons the properties required for these applications are much less restrictive than those of architectural glazing units and the production techniques can follow relatively simple methods.

In contrast to these previous proposals, the glazing units according to the invention intended for "building" applications provide a light transmission that remains very high. This transmission must take into account the absorption associated with the thickness of the glass sheets. In the case of 4 mm thick sheets of clear glass the transmission of the double glazing is not less than 60% of the incident light according to a measurement conducted for a D65 illuminant at an angle of 2°. With different thicknesses this value must be modified by the absorption of the glass itself at these thicknesses.

The possible use of glazing comprising sheets of so-called "extra-clear" glass necessarily leads to the increase in light transmission in proportions specific to this type of glass (from 2 to 3%).

Still with respect to previous techniques, the glazing units according to the invention must exhibit as little haze as possible and in all cases the haze must not be greater than 0.7% and preferably not greater than 0.5% (measured, for example, according to standard ASTM D1003-92).

The assembly of pyrolytic layers is traditionally obtained in float glass production plants by applying precursors of these layers directly to the ribbon of glass leaving the "float" at high temperature.

The pyrolytic layers obtained at the outlet of the pyrolysis unit are somewhat rough. As a result of their surface roughness alone, these layers also usually have a not insignificant haze. This haze is not disturbing in practice in glazing used in domestic appliances, but it is a different matter in architectural applications. To smooth out these surface irregularities it is known to perform a polishing operation on these layers. From experience, by conducting such a polishing operation enables the extent of this roughness to be reduced according to the invention so that it does not compromise the performance of the glazing in question.

Therefore, it is desirable according to the invention to subject the pyrolytic layer to a polishing operation once this layer has been formed. The polishing of the pyrolytic layer is advantageously such that the roughness Ra after polishing is not greater than 10 nm and preferably not greater than 6 nm.

In practice, polishing substantially reduces the haze resulting from the pyrolytic layer. Initially, depending on the pyrolytic layers considered, this haze amounts to approximately between 0.4 and 0.8% of the transmitted light. While it is commonly accepted that glazing units for architectural applications must not exhibit a haze greater than 0.7%, polishing conducted in the known conditions enables the haze to be reduced to a value preferably equal to or less than 0.5% and preferably equal to or less than 0.3%.

To arrive at better performance values, it is necessary with the glazing units according to the invention to simultaneously use the best pyrolytic layers and the best layers deposited by cathodic sputtering. For the pyrolytic layers a doped tin oxide-based layer is advantageously used. As known, the doping agent is either fluorine or antimony.

It is also known that the doped tin oxide-based layer must have a certain thickness. This thickness guarantees selective action on infrared rays while allowing a good neutrality of colour in reflection to be maintained. This thickness is at least 200 nm, but the neutrality is only at its best with discrete thicknesses that can vary as a function of the precise nature of the composition of these layers.

In particular, to improve the neutrality in reflection of the pyrolytic layers and benefit the light transmission, it is known to combine with the layer forming the infrared filter at least one other layer located below the first with an intermediate refractive index between that of the glass substrate and that of the layer that selectively filters infrared rays. These layers benefit in particular the neutralisation and elimination of variations in tint on the angle of observation. Known traditional layers are formed from oxides or combinations of oxide layers, in particular assemblies of layers of titanium oxide and silicon oxide, or tin oxide and silicon oxide, or silicon oxycarbide, SiOxCy. These layers or layer assemblies are also produced by pyrolysis directly onto the glass ribbon in float installations or at the outlet thereof.

The best arrangements with respect to pyrolytic layers such as those mentioned above result in emissivity values for these systems that are not higher than 0.20 and preferably not higher than 0.15 and particularly preferred equal to or lower than 0.10, for an application onto an ordinary clear float glass sheet with a thickness of 4 mm.

As indicated above, it is necessary to form an assembly by cathodic sputtering that is as efficient as possible with respect to emissivity without requiring the use of costly systems. In particular, for the latter reason specifically, the use of a layer system that only comprises a single silver layer is preferred.

When a single silver-based layer is present in these systems, this layer has a thickness ranging from 10 to 15 nm.

Layer systems obtained by cathodic sputtering that are both neutral in reflection and have better emissivity values allow emissivity values equal to or lower than 0.02, advantageously lower than 0.015 and in the most efficient systems lower than 0.01 to be achieved. In all cases, these systems are substantially more effective than the pyrolytic systems discussed above.

The combination of layer systems according to the invention allow particularly low thermal coefficient values to be achieved.

With the products according to the invention it is important that with their relative simplicity they enable the performance values reached with products of similar structure to be improved. When the systems in question are optimised, the presence of two layer systems on the two glass sheets already allows a product with a very low thermal coefficient U to be formed, and that is with a "usual" insulating gas such as argon. The inventors have also found that an additional improvement could be achieved by replacing this argon with krypton, but above all ensuring that the proportion of air in the insulating gas is as reduced as possible.

In the most usual insulating glazing systems, performance certifications are set up for an insulating gas composed to at least 90% of argon. No regulation is given with respect to the additional gas in the composition. In other words, the glazing is filled with argon starting from an atmosphere of air and the gas in addition to the argon is necessarily air.

The inventors have found that the presence of air, even in a limited proportion, is an essential factor that impairs possible performance values corresponding to the insulating gas. Therefore, the inventors have proposed a method, in which the proportion of air is as restricted as possible and in all cases does not exceed 5% by volume, preferably at most 3%, and particularly preferred can be lower than or equal to 1%.

To be effective, the proportion of krypton must be as high as possible. According to the invention, it is not lower than 86%, preferably not lower than 88% and particularly preferred not lower than 90%.

The choice of krypton as insulating gas enables the products according to the invention to be improved. The problem is to ensure that the volume of krypton used for filling is limited because of the cost of this gas. In practice, filling the glazing by progressively expelling the air initially present using krypton until the proportions of air indicated above are reached can result in an excess of krypton in relation to the useful volume of this gas being used in the final product.

To reduce the cost of the operation while adhering to the proportions of krypton and air recommended according to the invention, the inventors propose to preferably perform the filling with insulating gas in two stages. In a first stage, the air is expelled using argon until the air still present is significantly reduced. In a second stage, the argon and residual air are expelled using krypton.

In this way, it is possible to significantly reduce the proportion of air in the final product, which is thus composed mainly of krypton, a very small proportion of air and the rest composed of argon. The latter, though not as highly insulating as krypton, still remains a significant insulating material in contrast to air.

In insulating glazing units the optimisation of performance still concerns the distance separating the two glass sheets. The choice of spacing takes into account not only the conduction of the insulating gas, but also the particular features of the convection mechanisms specific to the gas in question. The greater the distance, the more the conduction is reduced.

Conversely, increasing the distance increases the convection. The combination of these two factors leads to an optimum spacing. For glazing units where the gas is essentially argon, the traditional spacings are in the order of 15 mm. For krypton, experience shows that the optimum corresponds to a smaller spacing. In consequence, according to the invention the distance between the glass sheets of the glazing substantially comprising krypton as insulating gas preferably amounts to between 6 and 15 mm and preferably between 8 and 12 mm. A distance in the order of 10 mm is the best compromise for krypton contents according to the invention.

The fact that the spacing is smaller with krypton limits the significance of the cost associated with use of this gas.

Commercial classifications of glazing systems are the subject of standards and are generally based on the values of coefficients U. The glazing units according to the invention allow thresholds to be crossed that were previously inaccessible for double glazing of the type in question with high light transmission. Thus, for a glazing unit composed of two sheets of clear glass each with a thickness of 4 mm spaced 10 mm apart, wherein the space is filled with a gaseous mixture comprising 86% krypton and less than 5% air, the coefficients U reached according to the invention can be lower than or equal to 0.85 W/m²·K (standard EN 673) and even lower than or equal to 0.8 W/m²·K.

The proportion of krypton in the insulating gas is preferably higher than 90% by volume to achieve the best performances.

The choice of the nature of the layers and their thicknesses is such that with an illuminant D65 at 2° for two sheets of clear glass 4 mm thick, the glazing units according to the invention exhibit, with respect to reflection to the outside, colorimetric coordinates in the CIELAB system that are advantageously such that:

$$6 \leq a^* \leq 3$$

$$6 \leq b^* \leq 3.$$

The invention is described in detail with reference to the set of drawings, in which.

Figure 1:
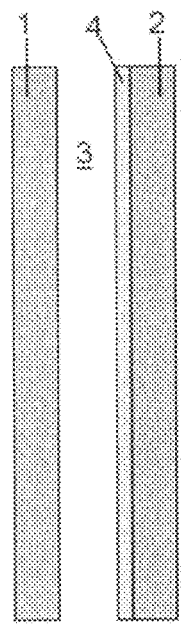
FIG. 1 is a schematic sectional view representing an insulating double glazing unit of the prior art.

The currently most usual insulating glazing systems are of the type represented in FIG. 1. They are formed from two glass sheets (1, 2) that in an enclosed space contain a column gas (3), most frequently argon chosen for its low coefficient of thermal conduction and moderate cost. The faces of the glass sheets are traditionally numbered commencing with that directed to the outside of the building.

A low-emissivity layer system (4) is applied in position 3. This system is usually formed from an assembly comprising a thin metal layer, most frequently silver-based, wherein this layer is included in an assembly of dielectric layers protecting the metal layer. The metal layer selectively reflects infrared rays. The dielectric layers protect the metal layer from various damages resulting, for example, from the diffusion of ions from the glass sheet or oxygen at the time of production of the superposed layers on the metal layer or after this production, in particular during thermal treatments. The function of the dielectric layers is still to limit the reflection of rays of visible wavelengths and to maintain a neutrality of colour in reflection.

The highest performing layer systems with respect to low-emissivity properties are those deposited by cathodic sputtering. These systems that are sensitive to mechanical stresses are arranged in the space located between the two glass sheets.

Low-emissivity systems can also comprise several reflective metal layers. The gain in terms of low-emissivity properties is relatively limited in relation to better systems that only comprise one metal layer. The benefit of the plurality of metal layers lies essentially in a better control of the reflection of visible wavelengths and consequently of the neutrality in reflection.

In optimised conditions, traditional insulating glazing units have, for example, layer systems such as those described in publication WO 2006/097513 and in particular with the following structure:

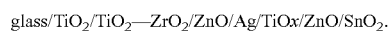

glass/TiO$_2$/TiO$_2$—ZrO$_2$/ZnO/Ag/TiO$x$/ZnO/SnO$_2$.

A clear glass sheet with a thickness of 3.85 mm coated with this layer system comprising a silver layer 12 nm thick can achieve an emissivity of 0.01. A double glazing of two 3.85 mm thick glass sheets, one coated with the above layer, the two sheets spaced 15 mm apart and the space between these sheets filled to 90% with argon, enables a coefficient of thermal transmission U defined according to standard EN 673 of at best 1.0 to be achieved as well as a light transmission of 70%, a solar factor of 50% according to standard EN 410.

The most usual "low-e" (low-emissivity) pyrolytic systems comprise a layer of doped tin oxide deposited onto a first layer with the role of neutralizing the colour in reflection. The layer in contact with the glass is usually a silicon (or silicon oxycarbide) layer possibly modified by additives. Compared to layer systems deposited by cathodic sputtering, tin oxide layers are relatively thick, more than 200 nm and in the case of some more than 450 nm. These thick layers are sufficiently resistant to withstand being exposed to mechanical and/or chemical stresses. In contrast to layers deposited by cathodic sputtering, they are not necessarily contained in a double glazing system. Their performance with respect to emissivity is much lower than that of layers deposited by cathodic sputtering consisting of one metal layer. The coefficients U for the highest performing layers are in the order of 0.15 or at best 0.10. For this reason, when on their own, pyrolytic layers are not desirable for glazing units that must achieve extreme emissivity values.

The performance values of this double glazing are indicated in Table 1, Example 1.

Figure 2:
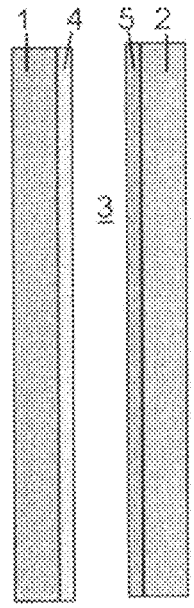
FIG. 2 is a view of another glazing unit with a structure that does not correspond to the invention and is provided for the purposes of comparison.

FIG. 2 shows a glazing unit used for purposes of comparison. For a double glazing again with 3.85 mm thick sheets spaced 15 mm apart, the space being filled with argon (90%), it comprises the combination of two layer systems (4, 5) respectively obtained by cathodic sputtering and by pyrolysis. The layers are arranged in the space between the glass sheets (1, 2) in positions 2 and 3 respectively.

For the low-e pyrolytic system the layer used is formed from a 470 nm thick layer of tin oxide doped with fluorine (2% at.). This layer rests on a 75 nm thick layer of silicon oxycarbide SiOxCy. The emissivity of this system deposited onto a 4 mm thick glass sheet amounts to 0.10 individually. The layer obtained by cathodic sputtering is the same as that indicated above with respect to FIG. 1.

The performance values are indicated in Table 1, Example 2.

In a variant the position of the two layers is reversed. The results are not modified (Example 2').

Figure 3:
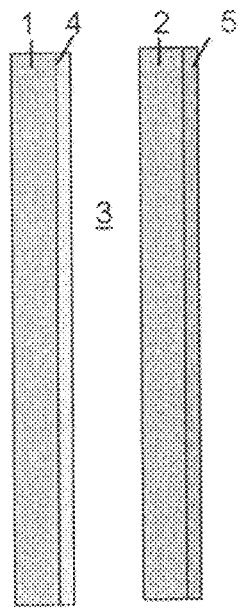
FIG. 3 is a view of a glazing unit according to the invention.

The structure of FIG. 3 shows a double glazing unit, each of the two layers of which being on one of the two sheets of the glazing, the pyrolytic layer (5) in position 4 and the layer deposited by cathodic sputtering in position 2. The layers are those specified above. The space between the two sheets is formed to at least 90% by argon. The results are those reported in Example 3 in Table 1.

Example corresponds to a configuration of a glazing unit according to the invention. It comprises two sheets of clear glass 3.85 mm thick spaced 12 mm apart and filled to 90% with krypton, 1% air and 9% argon. The pyrolytic layers and those deposited by cathodic sputtering are arranged in position 4 and 2 respectively. The hard pyrolytic system thus remains exposed to the outside whereas the layer system deposited by cathodic sputtering is protected in the space between the two glass sheets. The composition of the layers is as indicated above.

The properties are those indicated in Example 4 of Table 1.

TABLE 1

| Example | LT | Rext. | ET | ER | EA | g | LT/g | U |
|---|---|---|---|---|---|---|---|---|
| 1 | 70 | 20 | 41 | 38 | 21 | 50 | 1.40 | 1.0 |
| 2 | 62 | 24 | 36 | 39 | 25 | 43 | 1.44 | 1.0 |
| 2' | 62 | 20 | 36 | 28 | 36 | 44 | 1.41 | 1.0 |
| 3 | 62 | 23 | 36 | 39 | 25 | 43 | 1.44 | 0.9 |
| 4 | 63 | 23 | 36 | 40 | 18 | 43 | 1.47 | 0.8 |

The properties of visible transmission, LT, and reflection to the exterior, Rext., are data for an illuminant D65 at 2°. The properties of energy transmission, ET, reflection, ER, absorption, EA, and the solar factor, g, are measured in accordance with standard EN 410. The ratio LT/g is a measurement of selectivity of the glazing. The coefficient of thermal transmission U is expressed in $W/m^2 \cdot K$.

The arrangement according to the invention of the two layer systems, each on a separate sheet, improves the coefficient of thermal transmission in Examples 3 and 4. The presence of krypton in Example 4 allows a still better coefficient to be achieved.

Double glazing units have also been configured with thicker glass sheets in Example 5. Each sheet has a thickness of 5.85 mm. The space between the sheets is kept at 15 mm and the layers and filling remain identical to those in the above Example 4.

The properties are indicated in Table 2.

TABLE 2

| Ex. | LT | Rext. | ET | ER | EA | g | LT/g | U |
|---|---|---|---|---|---|---|---|---|
| 5 | 61 | 23 | 34 | 36 | 22 | 42 | 1.45 | 0.8 |

As previously, it is noted that the structure according to the invention enables an advantageous coefficient of thermal transmission to be achieved while maintaining a high light transmission.

The invention claimed is:

1. An insulating double glazing unit for use in a building, consisting essentially of, in the order listed:
   a first glass sheet, having a face exterior to the unit and a face interior to the unit;
   a soft low-emissivity assembly of layers produced by cathodic sputtering comprising an infrared-reflecting metal layer on the interior face of the first glass sheet;
   a closed space;
   a second glass sheet, having a face exterior to the unit and a face interior to the unit; and
   a hard metal oxide layer deposited by gas pyrolysis on the exterior face of the second glass sheet;
   wherein the exterior face of the first glass sheet is a glass surface of the first glass sheet and the interior face of the second glass sheet is a glass surface of the second glass sheet,
   wherein a roughness Ra of the surface of the hard metal oxide layer is less than 10 nm and the roughness is obtained by polishing, and
   a light transmission of the insulating double glazing unit is not less than 60% for a unit wherein each of the first and second glass sheets is 4 mm in thickness of clear glass,
   wherein the metal oxide layer comprises a layer of tin oxide doped with antimony or fluorine and has a thickness of not less than 200 nm, and
   wherein a haze value of the unit is less than 0.3%.

2. The glazing unit of claim 1, wherein the closed space comprises an insulating gas, the gas comprising at least 86% by volume of krypton and at most 5% of air.

3. The glazing unit of claim 2, wherein the insulating gas comprises at least 88% by volume of krypton and at most 3% by volume of air.

4. The glazing unit of claim 2, wherein the insulating gas comprises at least 90% by volume of krypton and at most 1% by volume of air.

5. The glazing unit of claim 1, wherein at least one silicon oxycarbide layer or an assembly of $TiO_2.SiO_2$ layers or an $SnO_2.SiO_2$ assembly is interposed between the second glass sheet and the layer of doped tin oxide.

6. The glazing unit of claim 1, wherein the metal oxide layer is such that an emissivity of a 4 mm thick clear glass sheet coated with the metal oxide layer is at most equal to 0.20.

7. The glazing unit of claim 1, wherein the low-emissivity assembly of layers is such that an emissivity of a 4 mm thick clear glass sheet coated with the assembly is at most equal to 0.02.

8. The glazing unit of claim 7, wherein the soft low-emissivity assembly of layers comprises a layer comprising silver which is from 10 to 15 nm in thickness.

9. The glazing unit of claim 2, wherein the insulating gas further comprises argon.

10. The glazing unit of claim 1, wherein the first and second glass sheets are spaced 6 to 15 mm apart.

11. The glazing unit of claim 1, wherein a thermal coefficient U is 0.85 or less.

12. The glazing unit of claim 1, wherein a coloration in reflection according to a CIELAB system with an illuminant D65 at 2°, comprises as colorimetric coordinates:

$$-6 \leq a^* \leq 3, \text{ and}$$

$$-6 \leq b^* \leq 3.$$

13. The glazing unit of claim 1, wherein the metal oxide layer comprises a layer of tin oxide doped with antimony.

14. The glazing unit of claim 1, wherein the metal oxide layer comprises a layer of tin oxide doped with fluorine.

15. The glazing unit of claim 1, wherein the first and second glass sheets are spaced 8 to 12 mm apart.

16. An insulating double glazing unit, consisting essentially of, in the order listed:
   a first glass sheet, having a face exterior to the unit and a face interior to the unit;
   a low-emissivity assembly of layers produced by sputtering comprising an infrared-reflecting metal layer on the interior face of the first glass sheet;
   a closed space;

a second glass sheet, having a face exterior to the unit and a face interior to the unit; and a metal oxide layer deposited by gas pyrolysis on the exterior face of the second glass sheet;

wherein the exterior face of the first glass sheet is a glass surface of the first glass sheet and the interior face of the second glass sheet is a glass surface of the second glass sheet, wherein a haze value of the unit is less than 0.3% wherein a thermal coefficient U of the unit is 0.85 or less, and wherein a light transmission of the insulating double glazing unit is not less than 60% for a unit wherein each of the first and second glass sheets is 4 mm in thickness of clear glass, wherein a roughness Ra of the surface of the hard metal oxide layer is less than 10 nm and the roughness is obtained by polishing, and wherein the metal oxide layer comprises a layer of tin oxide doped with antimony or fluorine and has a thickness of not less than 200 nm.

17. The glazing unit of claim 16, wherein the closed space comprises an insulating gas, the gas comprising at least 86% by volume of krypton and at most 5% of air.

18. The glazing unit of claim 16, wherein at least one silicon oxycarbide layer or an assembly of $TiO_2.SiO_2$ layers or an $SnO_2.SiO_2$ assembly is interposed between the second glass sheet and the layer of doped tin oxide.

19. The glazing unit of claim 16, wherein the metal oxide layer is such that an emissivity of a 4 mm thick clear glass sheet coated with the metal oxide layer is at most equal to 0.20.

20. The glazing unit of claim 16, wherein the low-emissivity assembly of layers comprises a layer comprising silver which is from 10 to 15 nm in thickness.

* * * * *